(12) United States Patent
Chung et al.

(10) Patent No.: US 8,755,591 B2
(45) Date of Patent: Jun. 17, 2014

(54) METHOD, MEDIUM AND APPARATUS CLASSIFYING AND COLLECTING AREA FEATURE INFORMATION ACCORDING TO A ROBOT'S MOVING PATH, AND A ROBOT CONTROLLED BY THE AREA FEATURES

(71) Applicant: Samsung Electronics Co., Ltd., Suwon-si (KR)

(72) Inventors: Seung-Nyung Chung, Yongin-si (KR); Hyun-jeong Lee, Yongin-si (KR); Hyun-jin Kim, Yongin-si (KR); Hyeon Myeong, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/909,260

(22) Filed: Jun. 4, 2013

(65) Prior Publication Data

US 2013/0274924 A1 Oct. 17, 2013

Related U.S. Application Data

(62) Division of application No. 11/711,635, filed on Feb. 28, 2007, now Pat. No. 8,463,018.

(30) Foreign Application Priority Data

Jun. 1, 2006 (KR) ........................ 10-2006-0049397

(51) Int. Cl.
*G06K 9/00* (2006.01)
*G06F 3/048* (2013.01)
*A47L 11/00* (2006.01)

(52) U.S. Cl.
USPC ........... 382/153; 700/258; 15/340.1; 715/825

(58) Field of Classification Search
None
See application file for complete search history.

(56) References Cited

U.S. PATENT DOCUMENTS

| 6,108,597 A | 8/2000 | Kirchner et al. |
| 6,748,297 B2 * | 6/2004 | Song et al. .................... 700/259 |
| 6,841,963 B2 * | 1/2005 | Song et al. ............... 318/568.12 |
| 6,868,307 B2 * | 3/2005 | Song et al. .................... 700/245 |
| 7,031,805 B2 * | 4/2006 | Lee et al. ...................... 700/245 |

(Continued)

FOREIGN PATENT DOCUMENTS

| JP | 5-257533 | 10/1993 |
| JP | 2001-212049 | 8/2001 |

(Continued)

OTHER PUBLICATIONS

U.S. Office Action issued Jan. 10, 2011 in copending U.S. Appl. No. 11/711,635.

(Continued)

*Primary Examiner* — Jon Chang
(74) *Attorney, Agent, or Firm* — Staas & Halsey LLP

(57) ABSTRACT

A method of classifying and collecting feature information of an area according to a robot's moving path, a robot controlled by area features, and a method and apparatus for composing a user interface using the area features are disclosed. The robot includes a plurality of sensor modules to collect feature information of a predetermined area along a moving path of the robot, and an analyzer to analyze the collected feature information of the predetermined area according to a predetermined reference range and to classify the collected feature information into a plurality of groups.

5 Claims, 15 Drawing Sheets

(56) References Cited

U.S. PATENT DOCUMENTS

| | | |
|---|---|---|
| 7,480,958 B2 * | 1/2009 | Song et al. ............... 15/319 |
| 2003/0056252 A1 | 3/2003 | Ota et al. |
| 2005/0057689 A1 * | 3/2005 | Sakagami ............... 348/460 |
| 2005/0192707 A1 | 9/2005 | Park et al. |
| 2006/0008151 A1 | 1/2006 | Lin et al. |
| 2006/0085095 A1 | 4/2006 | Reindle et al. |
| 2007/0069680 A1 | 3/2007 | Landry et al. |
| 2008/0151233 A1 | 6/2008 | Blanke et al. |
| 2008/0184518 A1 | 8/2008 | Taylor et al. |

FOREIGN PATENT DOCUMENTS

| | | |
|---|---|---|
| JP | 2002-85305 | 3/2002 |
| JP | 2004-49778 | 2/2004 |
| JP | 2004-237075 | 8/2004 |
| JP | 2004-326692 | 11/2004 |
| JP | 2005-122530 | 5/2005 |
| JP | 2005-205028 | 8/2005 |
| JP | 2005-230044 | 9/2005 |
| KR | 2002-0067696 | 8/2002 |
| KR | 2006-091602 | 8/2006 |

OTHER PUBLICATIONS

U.S. Office Action issued Jul. 28, 2011 in copending U.S. Appl. No. 11/711,635.

U.S. Office Action issued Jul. 5, 2012 in copending U.S. Appl. No. 11/711,635.

U.S. Notice of Allowance issued Feb. 14, 2013 in copending U.S. Appl. No. 11/711,635.

Japanese Office Action issued Nov. 24, 2009 in corresponding Japanese Patent Application 2007-143541.

Korean Office Action issued Jun. 21, 2007 in corresponding Korean Patent Application No. 10-2006-0049397.

U.S. Appl. No. 11/711,635, filed Feb. 28, 2007, Seung-Nyung Chung, Samsung Electronics Co., Ltd.

* cited by examiner

FIG. 5C

| | | | | | | | | |
|---|---|---|---|---|---|---|---|---|
| ⋮ | 100,10,A,a,x1,y1 | 100,10,A,c,x2,y2 | ⋮ | ⋮ | ⋮ | 120,30,B,b,x16,y16 | | ⋮ |
| ⋮ | 100,10,A,a,x1,y2 | 100,10,A,c,x2,y3 | ⋮ | ⋮ | ⋮ | 120,30,B,b,x16,y17 | | ⋮ |
| ⋮ | 100,10,A,a,x1,y3 | | | | | | | |
| ⋮ | 100,10,A,a,x1,y4 | | | | | 120,30,B,b,x16,y22 | | |
| | | | | | 120,20,C,b,x4,y15 | | | |
| | | | | | 120,20,C,b,x4,y17 | | | |

502

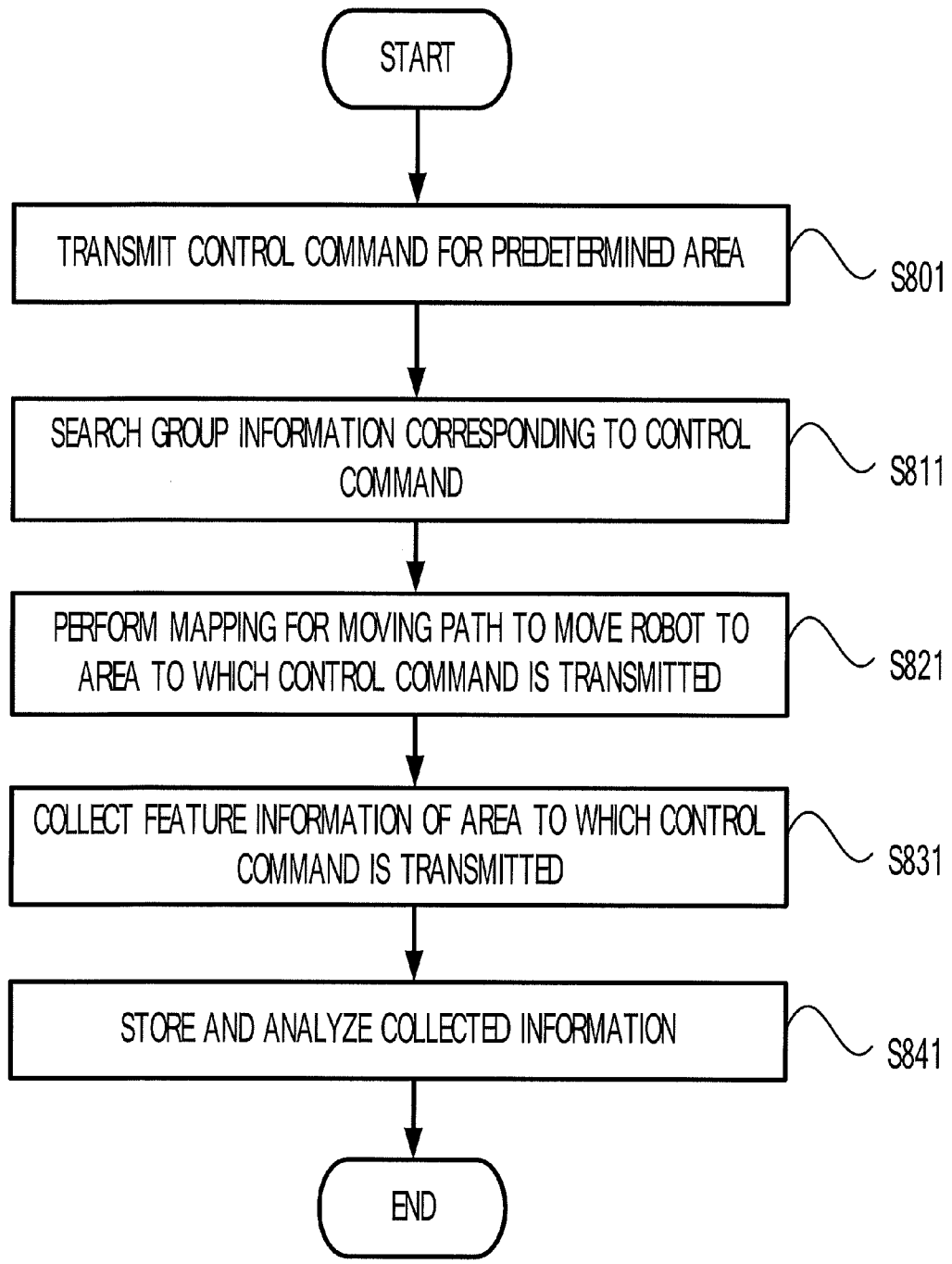

METHOD, MEDIUM AND APPARATUS CLASSIFYING AND COLLECTING AREA FEATURE INFORMATION ACCORDING TO A ROBOT'S MOVING PATH, AND A ROBOT CONTROLLED BY THE AREA FEATURES

CROSS-REFERENCE TO RELATED APPLICATIONS

This application is a divisional of U.S. application Ser. No. 11/711,635, filed Feb. 28, 2007, now pending, which is based on and claims priority from Korean Patent Application No. 10-2006-0049397 filed on Jun. 1, 2006, in the Korean Intellectual Property Office, the disclosures of all of which are incorporated herein by reference in its entirety.

BACKGROUND

1. Field

The present invention relates to a method, medium and apparatus classifying and collecting information on area features according to a robot's moving path, a robot controlled by the area features, and a method and apparatus for composing a user interface using the area features, and more particularly to a method, medium and apparatus classifying and collecting information on area features according to a robot's moving path, a robot controlled by the area features, and a method, medium and apparatus composing a user interface using the area features, in which information on the area features is collected and classified according to the robot's moving path and the robot's moving path is planned and controlled using the information.

2. Description of the Related Art

Various types of robots have been developed recently, using advanced technology. Particularly, a robot has been developed that executes tasks on behalf of a user while automatically moving in a room. Generally, a robot includes a driving module (e.g., a motor and wheels) provided with an encoder sensor (called an encoder or an odometry). The encoder sensor serves to determine the position of the robot. Furthermore, the robot is provided with a gyro sensor that exactly measures a rotational angle of the robot.

FIG. 1 illustrates a conventional technique of moving a cleaning robot and information for a prepared map.

As shown in FIG. 1A, a conventional cleaning robot executes cleaning while randomly moving, without generating a predetermined map 10, or executes cleaning while moving, according to a two-dimensional map, to only cover a given area without considering cleaning features 20.

As shown in FIG. 1B, a grid map may be prepared during an initial run of the robot. The probability of an obstacle existing in each grid is expressed as a predetermined value in the range of zero to two-hundred fifty five 30. It should be noted that the probability that a given obstacle exists becomes greater as the predetermined value becomes greater. Accordingly, no obstacle exists in the corresponding grid if the value is equal to zero. A moving path for the robot may be designed according to the probability that an obstacle exists for each grid.

However, a problem with the conventional technique described is that the unique features of each area found on the moving path of the robot are not considered. Accordingly, a method that collects feature information for a predetermined area along a moving path of a robot and uses the collected information as data for motion control of the robot has been found desirable by the inventors.

SUMMARY

One or more embodiments of the present invention provides a method, medium and apparatus of classifying and collecting information on area features according to a robot's moving path, a robot controlled by the area features, and a method, medium and apparatus for composing a user interface using the area features.

Additional aspects and/or advantages of the invention will be set forth in part in the description which follows and, in part, will be apparent from the description, or may be learned by practice of the invention.

To achieve at least the above and/or other aspects and advantage, embodiments of the present invention include a robot controlled by area features. The robot includes a plurality of sensor modules to collect feature information of a predetermined area along a moving path of the robot, and an analyzer to analyze the collected feature information of the predetermined area according to a predetermined reference range and to classify the collected feature information into a plurality of groups.

To achieve at least the above and/or other aspects and advantage, embodiments of the present invention include a method of collecting and classifying feature information of a predetermined area according to a moving path of a robot. The method includes collecting feature information of the predetermined area along the moving path of the robot, and analyzing the collected feature information of the predetermined area according to a predetermined reference range to classify the feature information into a plurality of groups.

To achieve at least the above and/or other aspects and advantage, embodiments of the present invention include an apparatus for composing a user interface using area features. The apparatus includes a menu construction module to construct a plurality of menus using feature information of a predetermined area, the feature information being collected along a moving path of a robot, and a transmitter to transmit a control signal corresponding to the menus.

To achieve at least the above and/or other aspects and advantage, embodiments of the present invention include a method of composing a user interface using area features. The method includes constructing a plurality of menus using feature information of a predetermined area, the feature information being collected along a moving path of a robot, and transmitting a control signal corresponding to the menus.

To achieve at least the above and/or other aspects and advantage, embodiments of the present invention include a robot moving on a floor including a sensing system to collect feature information of a predetermined area along a moving path during a first pass of the robot, and a navigation system to use the collected feature information to adjust a movement of the robot during one or more subsequent passes.

To achieve at least the above and/or other aspects and advantage, embodiments of the present invention include a robot cleaning a floor including a sensing system to collect feature information of a predetermined area along a moving path during a first pass of the robot, and a cleaning adjustment system to use the collected feature information to adjust the cleaning of the robot during one or more subsequent passes.

To achieve at least the above and/or other aspects and advantage, embodiments of the present invention include a robot moving on a floor including a sensing system to collect feature information of a predetermined area along a moving path during a first pass of the robot, a navigation system to use the collected feature information to adjust a movement of the robot during subsequent passes, and a cleaning adjustment system to use the collected feature information to adjust the cleaning of the robot during one or more subsequent passes.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5A-5C illustrate an example of feature data of a predetermined area, according to an embodiment of the present invention;

FIG. 8 illustrates a method of controlling a robot if a control command is transmitted to a predetermined area, according to an embodiment of the present invention.

DETAILED DESCRIPTION OF EMBODIMENTS

Figure 1A:
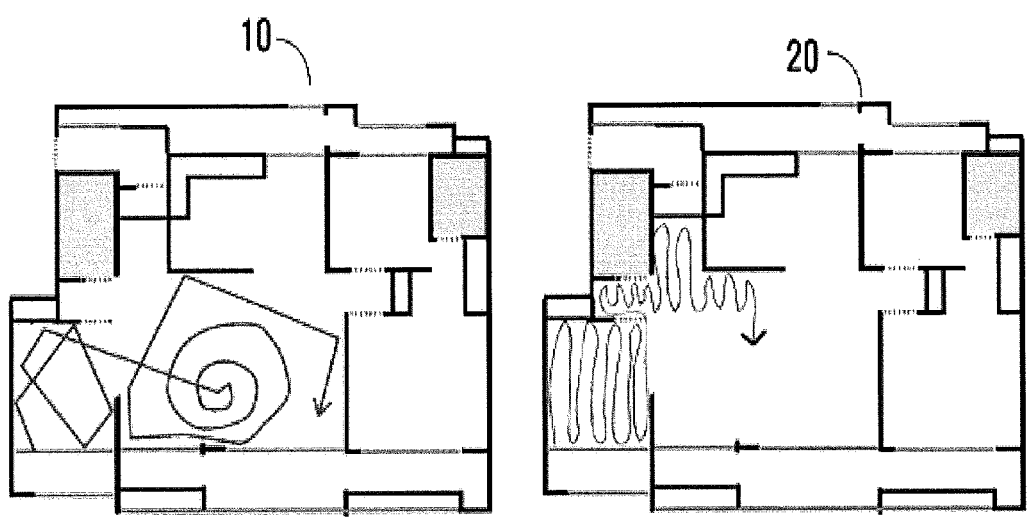
FIGS. 1A and 1B illustrate a conventional method of moving a cleaning robot and information of a prepared map, respectively.
Figure 1B:
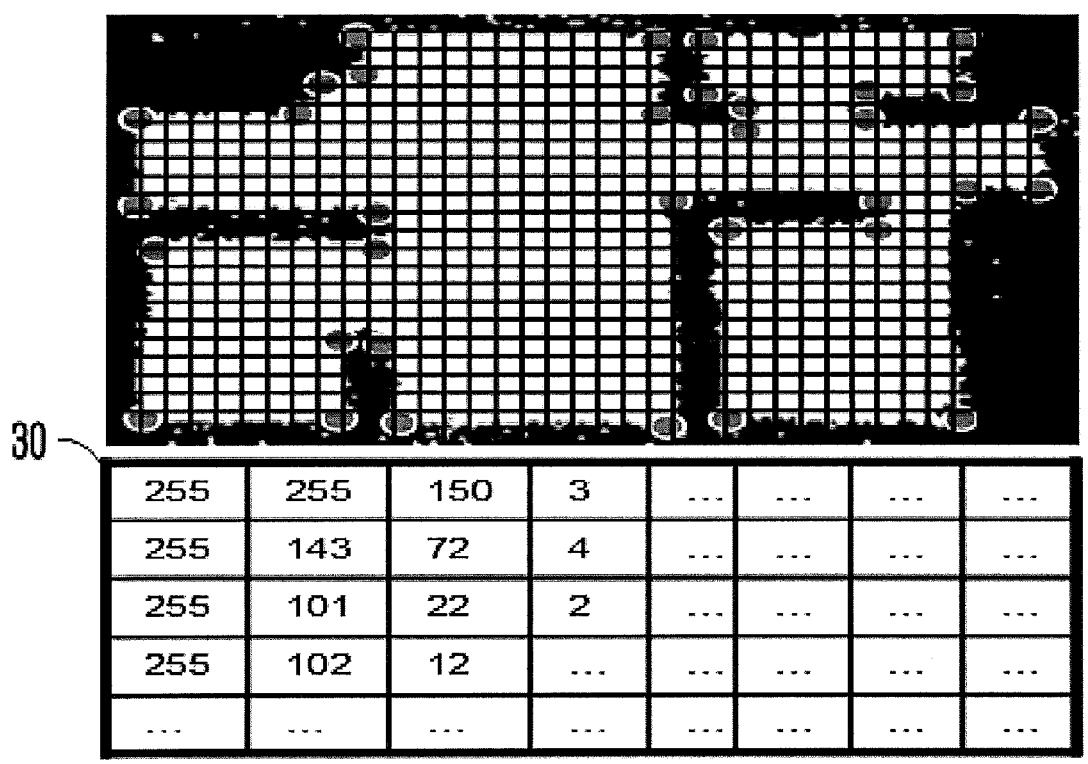

Reference will now be made in detail to embodiments of the present invention, examples of which are illustrated in the accompanying drawings, wherein like reference numerals refer to the like elements throughout. Embodiments are described below to explain the present invention by referring to the figures.

Figure 2A:
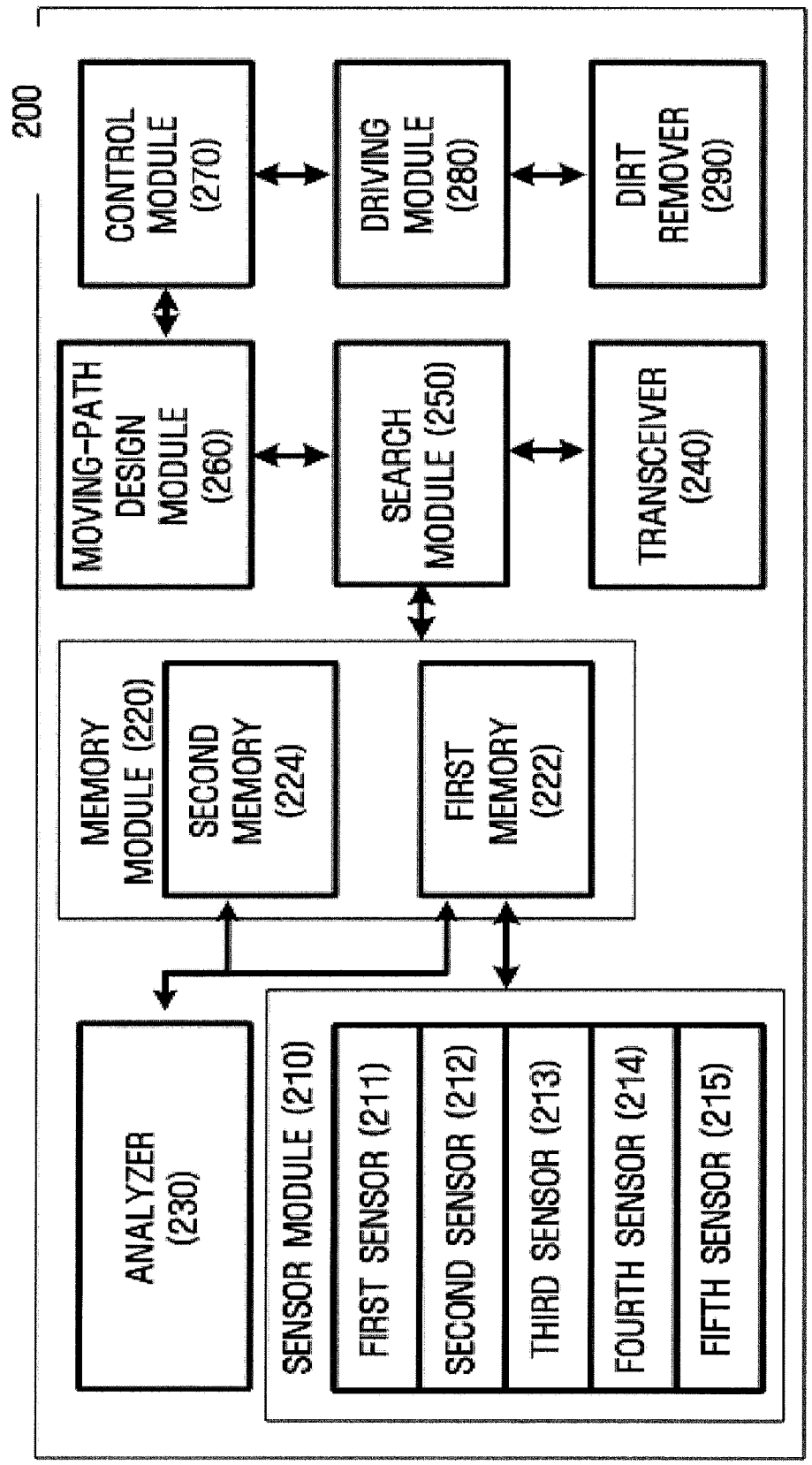
FIG. 2A illustrates a robot controlled by area features, according to an embodiment of the present invention.

FIG. 2A illustrates a robot controlled by area features according to an embodiment of the present invention.

Referring to FIG. 2A, a robot 200 controlled by area features may include a sensor module 210, a memory module 220, an analyzer 230, a transceiver 240, a search module 250, a moving path design module 260, a control module 270, a driving module 280, and a dirt remover 290, for example.

The sensor module 210 may collect feature information for a predetermined area along a moving path of the robot 200. The sensor module 210 may first collect position information and reference information regarding an obstacle when the robot 200 moves initially while preparing an inner structure map, hereinafter referred to as a base map, of a home. Also, the sensor module 210 may collect feature information regarding a predetermined area along the moving path after the base map is prepared, wherein the collected feature information of the predetermined area can later be added to the reference information collected, when the original base map is prepared. For example, if a user moves the robot 200 to a predetermined area using a button, e.g., attached to the robot 200, the sensor module 210 may collect position information regarding the area and information regarding a dust pollution level and a floor material. The collected information can be added to the information of the original base map. Here, the feature information of the predetermined area may be collected and stored while the original base map is being prepared. The feature information of the area can be added to a memory area by matching the position information of the reference information stored when the original map is prepared with position information of a predetermined area, which is later collected.

The sensor module 210 may include a first sensor 211 providing information regarding a distance between the robot 200 and an obstacle above the robot 200 in a predetermined area where the robot 200 is located, and a second sensor 212 providing information regarding a floor material in the area where the robot is located. The sensor module 210 may further include a third sensor 213 providing information on dust, or other pollution, levels for the area where the robot 200 is located. The sensor module 210 may further include a fourth sensor 214 providing position information regarding the area where the robot 200 is located, and a fifth sensor 215 providing information regarding an obstacle on a moving path of the robot 200 in a predetermined area. The information provided by the sensors may be stored in a predetermined area, and then may be initiated according to the user's selection, or updated whenever the robot 200 moves to a predetermined area, for example.

Any one or more of an ultrasonic sensor, an infrared sensor, a laser sensor, an optical sensor, an image sensor, and a touch sensor may be used as the first sensor 211, the second sensor 212, the third sensor 213, and the fifth sensor 215. Also, a gyroscope (or compass) or a position sensor, such as an encoder, may be used as the fourth sensor 214, wherein the gyroscope provides information regarding a rotational angle, and the encoder senses the operation of the robot's wheels, such as the rotational angle of the wheels, to provide information on motion speed. For example, a bumper may be fixed to the fifth sensor 215. In addition, various sensors may be used, as apparent to one skilled in the art. A method of collecting feature information of the area will be described later with reference to FIG. 3A through FIG. 5C.

As an example, the memory module 220 may include a first memory 222, storing feature information for the predetermined area collected by the sensor module 210, and a second memory 224 storing group information classified into a plurality of groups by analyzing and collecting the information of the first memory 222, according to a predetermined reference range. In an embodiment, the first memory 222 and the second memory 224 may be provided by dividing a single memory area or a hardware module. In addition, various memory areas may be provided as apparent to one skilled in the art.

The first memory 222 may store feature information for the predetermined area collected by the sensor module 210, for example. The first memory 222 may include reference information, such as information regarding an obstacle on the robot's path, and position information, which is collected when the original base map is prepared. Also, the first memory 222 may include information regarding a floor material of the area where the robot 200 is located, the distance between the robot 200 and the obstacle in the robot's path, information on the dust pollution level of the area where the robot 200 is located, position information for the area where the robot 200 is located, and information regarding obstacles on the robot's path, in the predetermined area for example. In addition, the first memory 222 may include a variety of information, such as information regarding the cleaning frequency of an area. The cleaning frequency can be obtained by counting the number of cleanings required for an area per unit of time, where cleaning is frequently executed.

The second memory 224 may store group information classified into a plurality of groups by analyzing and collecting the information in the first memory 222 through the analyzer 230. The second memory 224 may include identification information (e.g., G1 and G2) that can identify the classified groups, wherein the group information may include feature information for each area, collected by the sensor module 210, for example.

The analyzer 230 may analyze and collect the first memory 222 information according to a predetermined reference range, to classify the analyzed and collected information into a plurality of groups. In addition, the analyzer 230 may add feature information for the area to the reference information stored in the first memory 222, by matching the reference information collected when the original base map is prepared, with the feature information for the area. For example, the analyzer 230 may add the area feature information to the first memory 222 by matching the position information of the reference information collected when the original base map is prepared, with the position information for the area where the feature information is collected, for example.

The analyzer 230 may analyze information regarding the floor material of the area where the robot 200 is located, to classify each area into a plurality of groups according to the floor material, such as carpet, linoleum, tile, wood, and mat, for example. In addition, in an embodiment, the analyzer 230 may classify each area into a plurality of groups such as a group of 0 cm~30 cm, a group of 30 cm~50 cm, a group of 50 cm~90 cm, for example, according to height using the information regarding the distance between the robot 200 and the obstacle located on the robot's path. The analyzer 230 may also classify each area into a plurality of groups using the information on the dust pollution level of the area where the robot 200 is located.

Furthermore, the analyzer 230 may collect information stored in the first memory 222, relating to the floor material of the area where the robot 200 is located, the distance between the robot 200, an obstacle on the robot's path, the dust pollution level of the area where the robot 200 is located, and the frequency of cleaning, so as to classify the information into the plurality of groups. In other words, the analyzer 230 may provide a classification reference range such as a first priority order and a second priority order according to the frequency of cleaning and the floor material, respectively, may align the feature information of the area stored in the first memory 222 according to the priority order, and may classify each area into a plurality of groups according to the predetermined reference range to store them in the second memory 224, for example.

For example, in an embodiment a value of C1 can be given if the frequency of cleaning is greater than 10 times for a week, a value of C2 can be given if the frequency of cleaning belongs to a range of 6 times to 9 times, and a value of C3 can be given if the frequency of cleaning belongs to 1 time to 5 times. If each area is intended to be divided into the group having the greatest frequency of cleaning and a floor material of carpet, the analyzer 230 may search the information on the area corresponding to the frequency of cleaning of the value of C1 and the floor material of carpet from the first memory 222, may align the searched information, and may classify the information into the plurality of groups on the basis of the frequency of cleaning and the floor material, for example. In one or more embodiments, the cleaning strength may be controlled by making the cleaning strength strong if the frequency of cleaning in the predetermined area is lower than that of the other area, or by making the relative cleaning strength weak if the frequency of cleaning in the predetermined area is higher than that of the other area.

The transceiver 240 may transmit and receive a control command for an area to which the robot 200 will be moved. If the user selects the area, to which the robot 200 will be moved, through an apparatus 203 for composing user interface, which will be described later with reference to FIG. 2B, the transceiver 240 may receive the control command transmitted from a transmitter 209 of the apparatus 203 and may transmit the control command to the search module 250, for example.

The search module 250 may read the control command received through the transceiver 240 and search and extract information corresponding to the control command from the group information. If the user transmits a predetermined control command, the search module 250 may read the control command received through the transceiver 240 and may extract the information corresponding to the control command while searching the group information stored in the second memory 224. For example, if the user transmits the control command to move the robot 200 to an area having a high cleaning frequency by clicking a predetermined button, e.g., attached to the robot 200 to clean the area having a high cleaning frequency, the search module 250 may search the group information grouped by the areas having the high cleaning frequency from the second memory 224 according to the control command to extract the group information. Likewise, if the user selects carpet by clicking a touch screen of the robot 200 to clean the area of the floor having carpet, the search module 250 may search the group information grouped by the areas of the floor having carpet from the second memory 224 to extract the group information, for example.

Furthermore, if the user designates a predetermined area through a remote controller to transmit the control command toward the predetermined area, the search module 250 may read the control command and search the information corresponding to the control command from the group information to extract the information.

The moving path design module 260 may design the moving path of the robot 200 using the group information searched from the search module 250, as an example. There, for example, if the predetermined area is classified into the groups such as carpet, linoleum, and tile and then stored in the second memory 224, the user may designate carpet to allow the search module 250 to search the group information corresponding to the area of the floor having carpet and extract the searched group information. Then, the moving path design module 260 may design the moving path of the robot 200 using the extracted group information. In an embodiment, the moving path design module 260 executes design of the moving path according to the group information having the floor covered with carpet by giving the priority order to an area closest to the area where the robot 200 is located. The control module 270 may control a moving direction of the robot 200 according to the moving path of the robot 200, wherein the moving path is designed by the moving path design module 260. If the user selects the area, to which the robot 200 will move, through a button or selection screen (e.g., a touch screen and an LCD, potentially) attached to the robot 200, or a remote controller, the control module 270 may control the moving direction of the robot 200 according to the moving path of the robot, designed by the moving path design module 260, using the group information searched from the search module 260 according to the user's selection, and may move the robot 200 through the driving module 280. Accordingly, under various conditions such as a limited power supply and a limited cleaning time caused by peripheral circumstances, the collected feature information of the area is added to the reference information of the original base map and the moving path of the robot may be determined using the feature information of the area, whereby the robot may execute efficient cleaning. The driving module 280 may move the robot 200 under the control of the control module 270. In an embodiment, a wheel-type device may be used as the driving module 280, for example.

The dirt remover 290 may remove dirt or debris on the moving path of the robot 200. The dirt remover 290 sucks external dust or contaminant material in the course of sucking external air. In addition, if the contaminant material is scattered on the floor due to jet of steam, the dirt remover 290 may collect the corresponding contaminant material, for example.

Figure 2B:
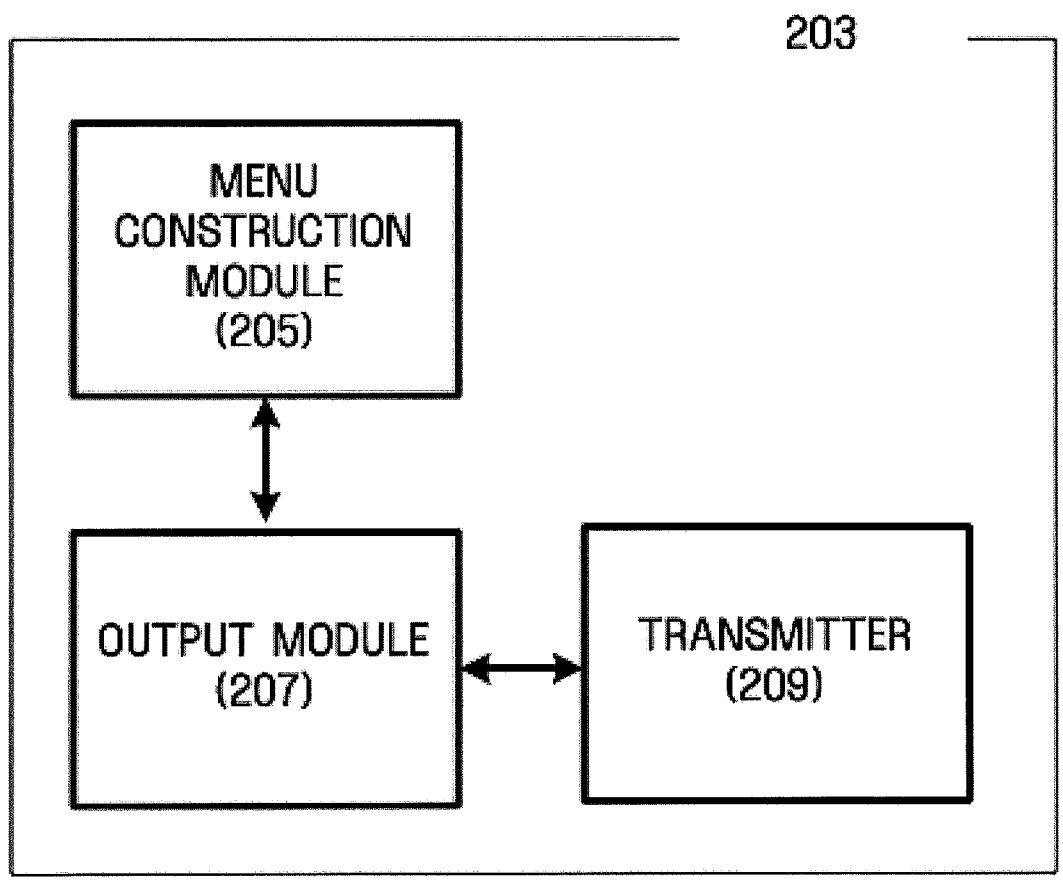
FIG. 2B illustrates an apparatus composing a user interface (UI) using area features, according to an embodiment of the present invention.

FIG. 2B illustrates an apparatus for composing a user interface using the area features, according to an embodiment of the present invention.

The apparatus 203 using area features may include a menu construction module 205, an output module 207, and a transmitter 209, for example.

The menu construction module 205 may construct a plurality of menus using feature information for a predetermined area. For example, the menu construction module 205 may construct the menus according to the floor material, the dust pollution level, the cleaning frequency, and home furniture (i.e. any obstacle located on the robot's path) using the group information classified by the analyzer 230. In other words, the menu construction module 205 may construct the menus to reflect carpet and linoleum according to the floor material, using the information stored in the second memory, which stores the group information classified by the analyzer 230. The menu construction module 205 may also construct the menus to reflect upper, middle and lower levels according to the dust pollution level, construct the menus to reflect upper, middle and lower levels according to the cleaning frequency, and construct the menus to reflect table and bed, according to the home's furniture. As another example, the menu construction module 205 can construct the menus by simplifying the menu to reflect only a dust pollution level at upper, middle and lower levels, or may construct the menu to reflect a home furniture name (e.g., bed), corresponding only to an area having a high pollution level.

The output module 207 may output the menus constructed by the menu construction module 205 to a screen or other display. For example, the output module 207 may output the menus to an LCD screen attached to the robot 200 or may output the menus to an LCD screen of a remote control. The LCD screen may include a touch screen. The output module 207 may output the menus to a communication device (e.g. a digital TV or a computer) connected with the robot through a wireless network. Accordingly, if the menus are constructed according to home furniture, a list including a table, a bed, and other home furniture may be output to the screen. The user may select a bed, or other item of furniture from the menu list using the output module 207 and may transmit the control command with the transmitter 209.

In another embodiment, a plurality of buttons, e.g., attached to the robot/remote controller, for example, may be used instead of, or in addition to, the output module 207. If the buttons are used as the output module 207, a plurality of menus may be set by the buttons to allow the user to select them, for example.

The transmitter 209 may transmit a control signal corresponding to the menus selected by the user. For example, if the user clicks a dust pollution level menu, e.g., corresponding to the upper level, on the screen of the output module 207, the transmitter 209 may transmit the corresponding control signal to the transceiver 240.

Each component shown in FIGS. 2A and 2B may be made up of a "module".

Figure 3A:
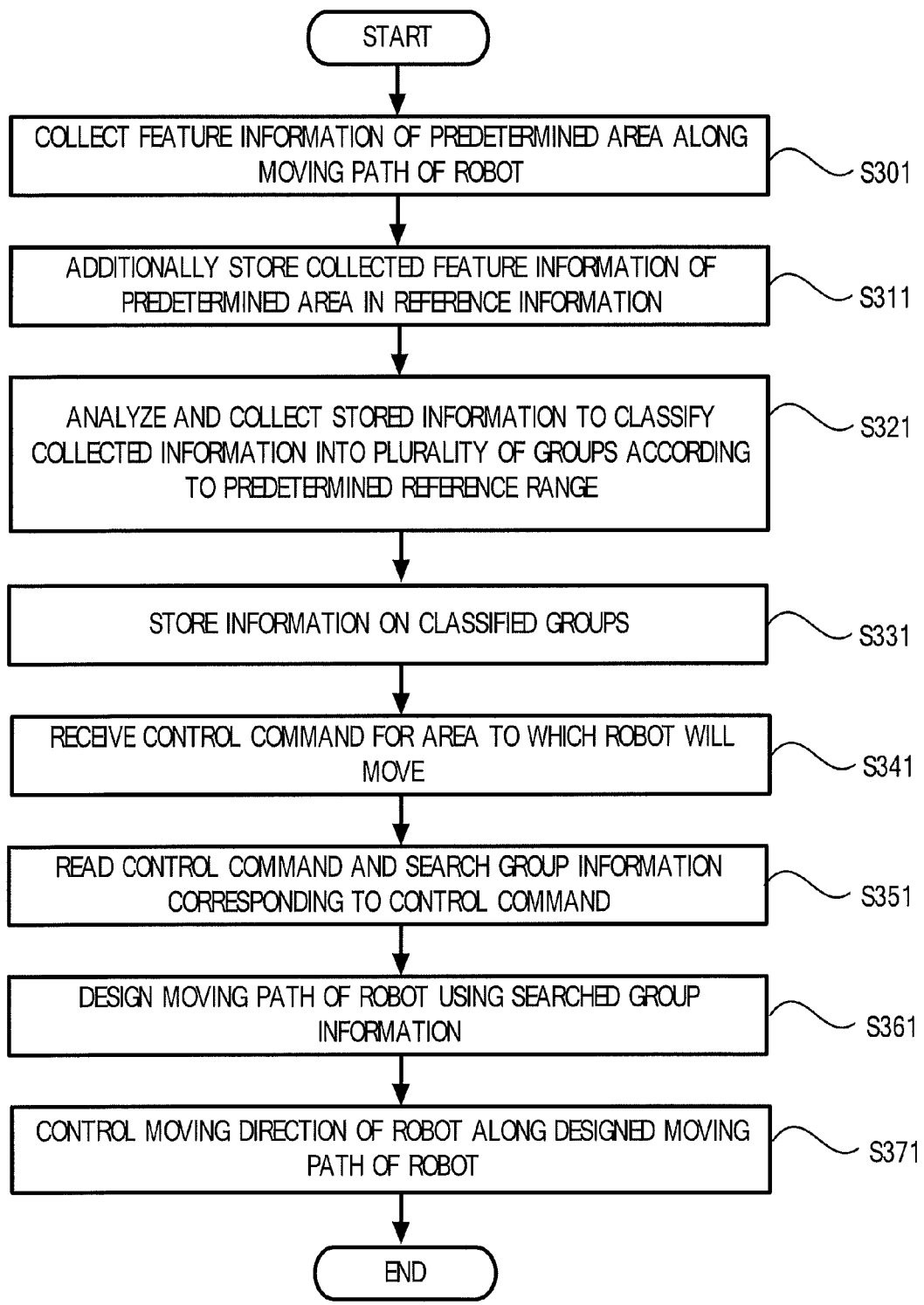
FIG. 3A illustrates a method of collecting and classifying feature information of a predetermined area along a moving path of a robot such as that of FIG. 2, according to an embodiment of the present invention.

FIG. 3A illustrates a method of collecting and classifying the feature information of the predetermined area according to the moving path of the robot such as that of FIG. 2A, according to an embodiment of the present invention.

The repeated description described in FIG. 2A will be omitted, and the operations for designing the moving path of the robot 200, using the feature information of the predetermined area will be now described in greater detail.

First, the sensor module 210 may collect the feature information of the predetermined area along the moving path of the robot 200 in operation S301. The sensor module 210 may collect various kinds of information, such as the floor material of the area where the robot 200 is located, the distance between the robot 200 and an obstacle above the moving path of the robot 200, the dust pollution level of the area where the robot 200 is located, position information for the robot 200, and information regarding an obstacle on the moving path of the robot 200 in the predetermined area. The information may be collected using the plurality of sensors.

The first memory 222 may store the feature information of the predetermined area collected by the sensor module 210, in operation S311. Here, the feature information of the predetermined area may be added to the reference information stored in the first memory 222 when the original base map is prepared. The information may be added in such a manner that the position information of the reference information collected when the original base map is prepared is matched with the position information of the predetermined area collected later through the analyzer 230, and then the feature information of the area is added to the position of the memory area where matching is executed, for example.

Next, for example, the analyzer 230 may analyze and collect the information stored in the first memory 222, according to the predetermined reference range, to classify the information into a plurality of groups, in operation S321.

Here, the second memory 224 may store the group information classified by the analyzer 230, in operation S331. The second memory 224 may include identification information, e.g., G1 and G2, given to each group to identify the classified groups. The group information may include feature information for each area, for example, information collected by the sensor module 210.

If the user commands the robot 200 to move to an area, such as by using the apparatus 203 such as the button or screen, e.g., a touch screen or an LCD screen, attached to the robot 200 or the remote controller, the transceiver 240 receives the control command for the area to which the robot 200 will move, in operation S341. For example, if the robot 200 (or remote controller) is provided with the plurality of buttons according to the floor material (e.g., carpet, linoleum, and wood) and the user selects the carpet group by clicking the first button, the transceiver 240 may receive the control command of the first button. Also, if the user transmits the control command towards the predetermined area using the remote controller, the transceiver 240 may receive the control command and the search module 250 may search group information corresponding to position information of the control command, for example.

Next, the search module 250 may read the control command received through the transceiver 240 to search the information corresponding to the control command from the group information in operation S351. In more detail, the search module 250 may read the control command received through the transceiver 240 if the user transmits the control command, and may extract the information corresponding to the control command while searching the group information stored in the second memory 224, for example.

Then, the moving path design module 260 may design the moving path of the robot 200 using the group information searched by the search module 250, in operation S361.

The control module 270 may control the moving direction of the robot 200 according to the moving path of the robot designed by the moving path design module 260, in operation S371. At this time, the robot 200 removes dirt on the moving path.

Figure 3B:
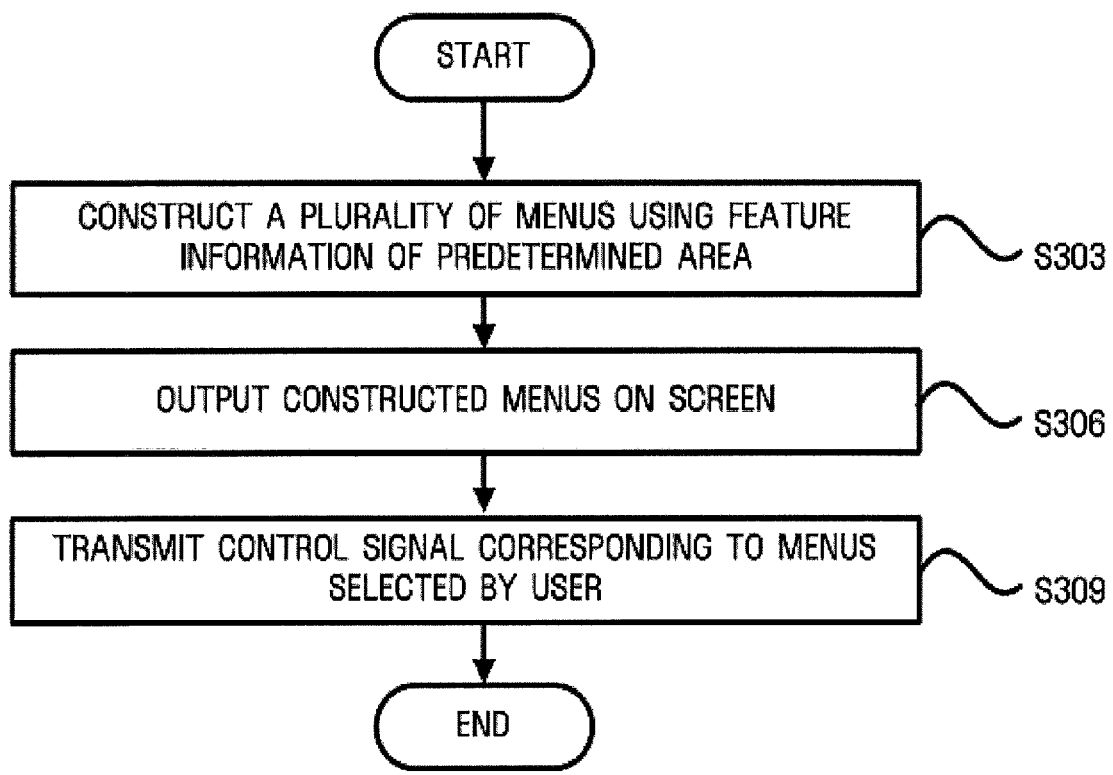
FIG. 3B illustrates a method of composing a user interface such as by using the apparatus of FIG. 2A, according to an embodiment of the present invention.

FIG. 3B illustrates a method of composing the user interface using FIG. 2B, for example.

The repeated description described in FIG. 2B will be omitted, and the operations of composing the user interface using area features will now be described in greater detail.

The menu construction module 205 constructs the plurality of menus using the feature information of the predetermined area, in operation S303. For example, the menu construction module 205 may construct the menus according to the floor material, the dust pollution level, the cleaning frequency, and the home furniture using the group information classified by the analyzer 230.

The output module 207 may output the menus constructed by the menu construction module 205 onto the screen, in operation S306. For example, the output module 207 may output the menus onto the LCD screen attached to the robot 200.

The transmitter 209 may transmit the control signal corresponding to the menus selected by the user, in operation S309.

Figure 4A:
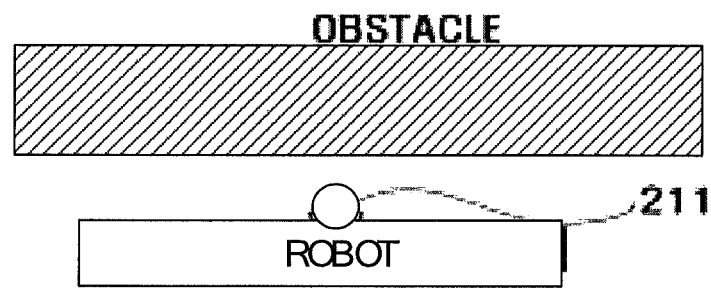
FIGS. 4A-4C illustrate a method of collecting various kinds of feature information of a predetermined area along a moving path of a robot, according to an embodiment of the present invention.
Figure 4B:
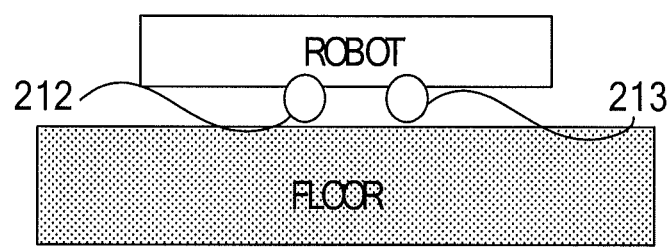
Figure 4C:
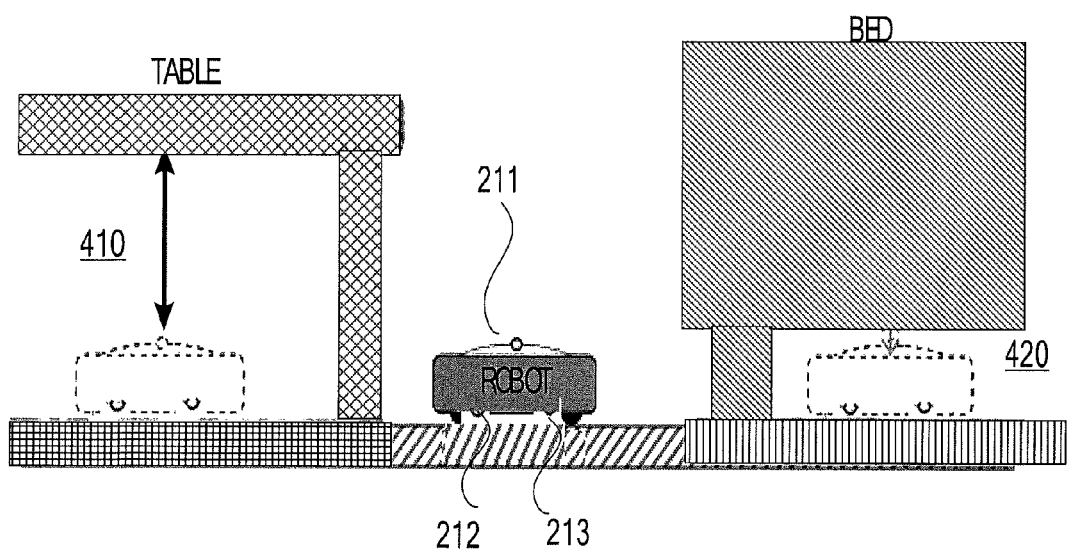

FIGS. 4A-4C illustrate a method of collecting various kinds of feature information of a predetermined area along the moving path of the robot, according to an embodiment of the present invention.

As shown in FIG. 4A, the first sensor 211 may be attached to the upper portion of the robot 200, so as to provide the distance information between the robot 200 and the obstacle above the robot 200 in the predetermined area where the robot 200 is located. Here, the ultrasonic sensor, the infrared sensor, the laser sensor, the optical sensor, the image sensor, and the touch sensor, or any other sensor may be used as the first sensor 211. For example, if the ultrasonic sensor is attached to the upper portion of the robot 200, the robot 200 may measure the distance to an obstacle located on the robot's path using a timing period corresponding to a restoring time of reflected ultrasonic waves, which are emitted toward the obstacle located above the robot 200. Since a bed is generally lower than a table, each area may be classified into a plurality of groups according to a predetermined reference range using the distance information, for example. In other words, each area may be classified into a plurality of groups according to a predetermined reference range, such as a range of 0 cm~30 cm, a range of 30 cm~50 cm, and a range of 50 cm~90 cm, for example, using the distance information between the robot 200 and the obstacle located above the robot 200. For example, the area where the bed is located is classified into one group according to a reference value of 0 cm~30 cm, and the area where the desk, table, and chair are located can be classified into another group according to a reference value of 30 cm~50 cm.

Furthermore, as shown in FIG. 4B, the second sensor 212 may be attached to a lower surface of the robot 200, for example, so as to provide information on the floor material corresponding to the area where the robot 200 is located. The third sensor 213 may also be attached to another lower surface of the robot 200, for example, so as to provide the information on the dust pollution level corresponding to the area where the robot 200 is located. The ultrasonic sensor, the infrared sensor, the laser sensor, the optical sensor, the image sensor, the touch sensor, or any other sensor may be used as the second sensor 212. The second sensor 212 may provide image information such as the floor material and shape, for example. The information regarding the floor material corresponding to the area where the robot 200 is located may be analyzed so as to classify each area into a plurality of groups according to the floor material such as carpet, linoleum, tile, wood, and mat. Various sensors for measuring a dust pollution level, for example, may be used as the third sensor 213.

In addition to the sensors described in FIG. 4A and FIG. 4B, a fourth sensor or a fifth sensor, or both, may be attached to the robot 200 to collect the feature information of the predetermined area. The fourth sensor may provide position information regarding the area where the robot 200 is located, and the fifth sensor may provide information regarding any obstacle on the moving path of the robot 200 in the predetermined area. A position sensor such as a gyroscope or a compass and an encoder may be used as the fourth sensor, for example. Also, a bumper may be attached to the fifth sensor.

As shown in FIG. 4C, the robot 200 may collect feature information regarding a predetermined area while moving to the area inside a home. The robot 200 may move to a table or a bed, or both, such as areas 410 and 420, so that distance information between the table and the bed located above the robot 200 can be sensed through the first sensor. Also, a floor material of the area where the robot 200 is located may be sensed through the second sensor 212, for example. The dust pollution level of the area where the robot 200 is located may also be sensed through the third sensor 213, for example, and the position information of the area where the robot 200 is located may be sensed through the fourth sensor, for example. Accordingly, the distance information between the robot 200 and the obstacle (e.g., table or bed) located above the robot 200, the information on the floor material corresponding to an area where the robot 200 is located, the position information (coordinates) of the area where the robot 200 is located, and the information regarding the dust pollution level may be obtained through the aforementioned sensors, as examples only. These kinds of information may be stored in the memory area and then may be analyzed and collected to classify the information into a plurality of groups, whereby the information may be stored for each group.

Figure 5A:
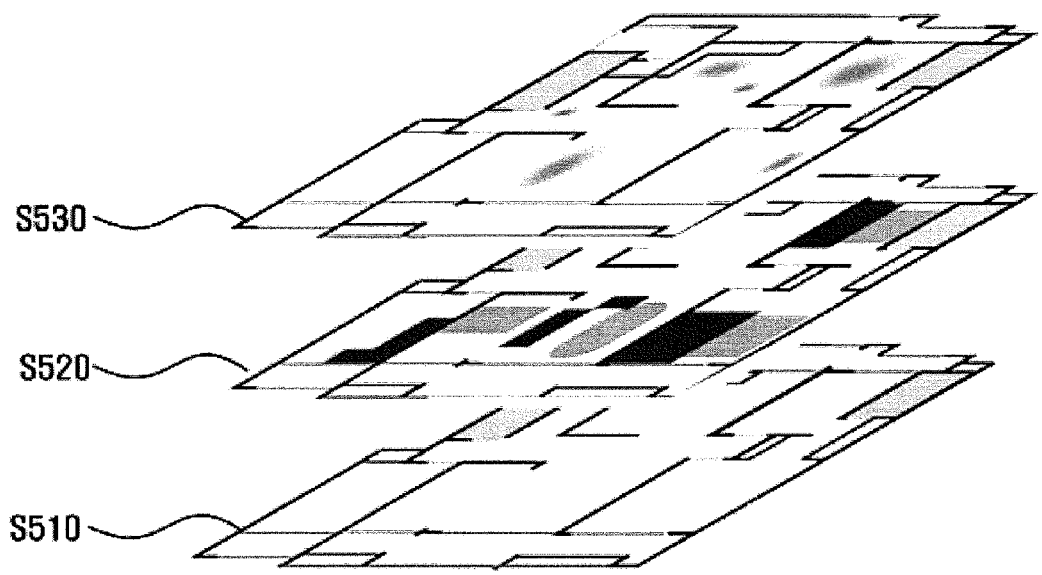
Figure 5B:
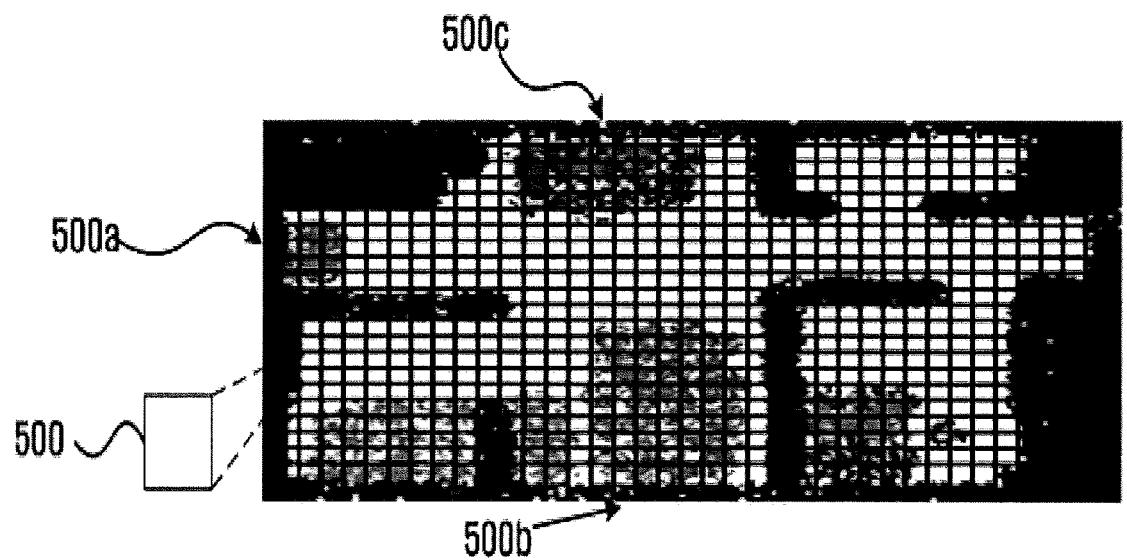

FIGS. 5A-5C illustrate an example of feature data of the predetermined area, according to an embodiment of the present invention.

As shown in FIG. 5A, the robot 200 may originally prepare a base map of a structure inside a home along the moving path of the robot, in operation S510. The base map may be a grid type map, and the probability of an obstacle existing in each grid and the position information for the obstacle are expressed by a predetermined value that can be stored as reference information, for example.

If the base map is completely prepared, the feature information of the predetermined area may be collected along the moving path of the robot 200, and the collected information may be added to the reference information of the base map in operation S520. Examples of the feature information of the predetermined area include the floor material, the distance between the robot 200 and an obstacle located above the robot 200, the information on the dust pollution level of the area where the robot 200 is located, the position information of the area where the robot 200 is located, and the information regarding an obstacle on the moving path of the robot 200 in the predetermined area. For example, to store such feature information, the user may collect the feature information of the predetermined area by positioning the robot in the predetermined area, or when the base map is prepared in operation S510. In other words, the user may collect position information for an area having a high dust pollution level and the information on the floor material, by positioning the robot 200 in the high dust pollution area, and may add the collected information to the reference information of the base map. Alternatively, the user may collect the feature information of the predetermined area when the base map is prepared. The collected feature information may be stored in a database of the predetermined memory area.

Furthermore, for an area frequently cleaned by the robot 200, the user may add information on the cleaning frequency, to the collected information or may separately process the feature information for each area, in operation S530. As shown in FIG. 5B, the information collected in each of the operations S510 to S520 can be collected and then may be expressed as a grid type map according to features of the predetermined area. The grid 500 may represent the predetermined area where various kinds of information are collected by the robot 200. In FIG. 5B, areas 500a, 500b, and 500c expressed by the same color, have similar or identical features.

As shown in FIG. 5C, the information collected by the plurality of sensors may be expressed by predetermined data values corresponding to each grid of FIG. 5B. In other words, the information collected by the operations S510 to S520 may be expressed by predetermined data values. For example, the data values may be stored in such a manner that the feature information in operations S520 to S530, of the predetermined area where the robot 200 is located, is added to the information (e.g., the position information, and the obstacle information) collected along the moving path of the robot 200 when the map is originally prepared, for example. Alternatively, the data values may be stored in such a manner that the feature information of the predetermined area is collected when the map is prepared.

The plurality of sensors may provide (a) information regarding the distance between the robot 200 and an obstacle located above the robot 200, (b) information regarding the floor material of the area where the robot 200 is located, (c) information regarding the dust pollution level of the area where the robot 200 is located, (d) position information for the area where the robot 200 is located, and (e) information regarding an obstacle on the moving path of the robot 200 in the predetermined area, for example, in any manner or order.

For the distance information (a), the first sensor 211 may measure the distance between the robot 200 and the obstacle located above the robot 200. The first sensor 211 may measure the distance value in any measurement unit such as a centimeter or a meter. In the case of home furniture, the distance value between the robot 200 and a lower surface of the home furniture located above the robot 200 may be measured and stored in the first sensor 211, for example. For the floor information (b), the second sensor 212 may sense the floor material of the area where the robot 200 is located, so as to provide information regarding the floor material. The floor material may be classified into carpet, linoleum, tile, wood, and mat, as examples, so that a predetermined value may be given according to the material. For the dust pollution information (c), the third sensor 213 may measure the dust pollution level of the area where the robot 200 is located. For the position information (d), the fourth sensor 214 may measure the position information of the area where the robot 200 is located. The position information may be expressed by any coordinate values, such as x and y coordinates, for example. For the obstacle information (e), the fifth sensor 215 may provide information on an obstacle in the moving path of the robot 200 in the predetermined area. For example, a probability of a wall or other obstacle existing on the moving path of the robot 200 may be expressed by the predetermined value.

Identification values such as numerical value or character, or both, are given to the values measured in the information (a) to (e) according to the predetermined reference range and then may be stored in the memory area. In an embodiment, the predetermined reference range may be determined in the range of 0 cm~30 cm, 30 cm~50 cm, and 50 cm~90 cm using distance information between the robot 200 and the obstacle located above the robot 200, and the predetermined identification value may be given according to each reference range. For example, the identification value of 100 may be given in the range of 0 cm~30 cm, the identification value of 110 may be given in the range of 30 cm~50 cm, and the identification value of 120 may be given in the range of 50 cm~90 cm. Various numerical values may also be given according to the floor material. For example, a numerical value of 10 may be given to the floor material of carpet, a numerical value of 20 may be given to the floor material of linoleum, a numerical value of 30 may be given to the floor material of tile, and a numerical value of 50 may be given to the floor material of mat, as examples. Also, predetermined identification values of A through F, as examples only, may be given to each area according to the measured dust pollution leveling that area. For example, a value of A may be given to an area having a low dust pollution level, and a value of F may be given to an area having a relatively high dust pollution level. Furthermore, if existence probability values of the obstacle are classified into the range of 0 through 255, the existence probability of the obstacle is low in the range of 0 to 50 and is high in the range of 200 to 255, wherein the low existence probability of the obstacle may be expressed as "a" and the relatively high existence probability of the obstacle may be expressed as "c" to give such predetermined identification values according to the probability values. It is apparent that various reference ranges according to the measurement values measured by the plurality of sensors and various identification values given by the reference ranges may be provided, as may be determined by one skilled in the art.

Accordingly, referring to FIG. 5C as only an example, for the feature information of the area where the robot 200 is located, if information on a predetermined grid is stored in the first memory 222 as 100, 10, A, a, x1, and y1 502, the numeral "100" represents that the distance between the robot 200 located on the predetermined area and the obstacle located above the robot 200 is in the range of 0 cm~3 cm, 10 represents that the floor material is of carpet, A represents that the dust pollution level is low, a represents that the existence probability of an obstacle is low, and x1 and y1 represent coordinates of x and y axes showing position information of the area where the feature information of the predetermined area is collected. The information of FIG. 5C stored in the first memory 222 may be classified into groups according to the features of the area and then may be stored in the second memory 224 as shown in FIGS. 6A-6B, for example.

Figure 6A:
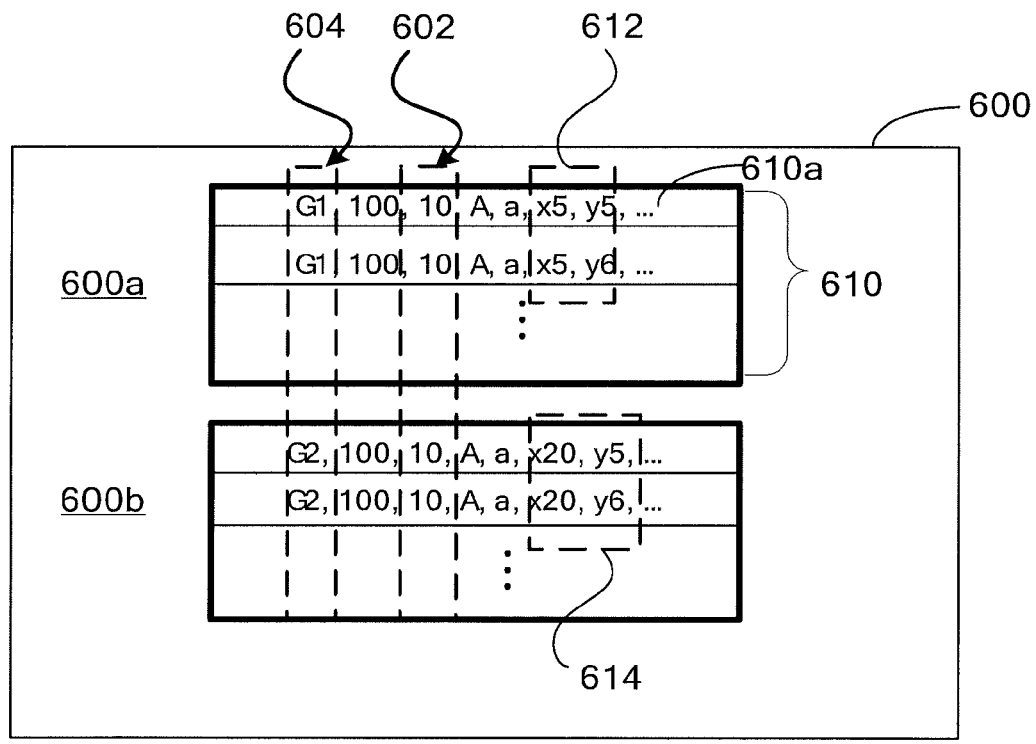
FIG. 6A-6B illustrate one example of group information classified into predetermined groups using FIG. 5, according to an embodiment of the present invention.
Figure 6B:
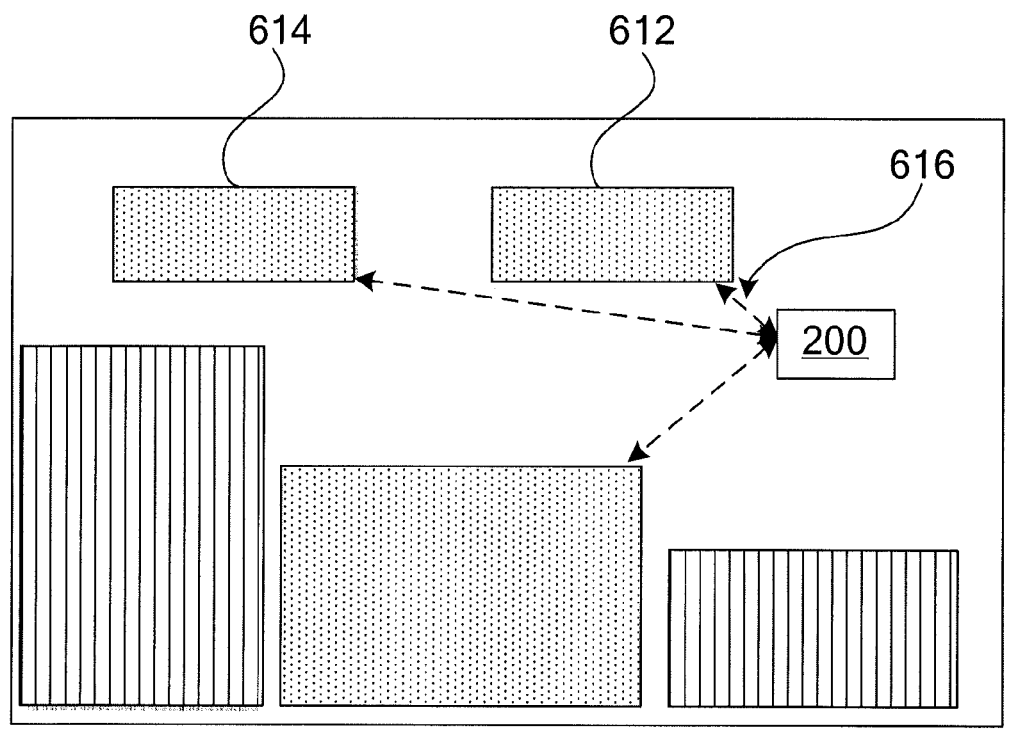

FIGS. 6A-6B illustrate one example of group information classified into predetermined groups using FIGS. 5A-5C.

The feature information of the predetermined area collected by the sensor module 210 may be stored in the first memory 222, and the analyzer 230 may analyze and collect the information in the first memory 222 according to the predetermined reference range and may classify the collected information into the plurality of groups. The classified group information may then be stored in the second memory 224.

As shown in FIG. 6A, if the collected information is intended to be classified into a plurality of groups according to the floor material, the highest priority order may be given to the floor material so that each group is classified first on the basis of the floor material, as an example. The analyzer 230 may give carpet the value of 10, as in 602, linoleum the value of 20, tile the value of 30, wood the value of 40, and mat the value of 50, and the values may be stored in the first memory 222. In addition, if a group of the information (a) to (e) described in FIGS. 5A-5C is stored, the highest priority order may be given to the floor material. For example, the analyzer 230 may classify the group into a carpet group 600, a linoleum group, and the like according to the floor material. The data may also be classified using any other group as a priority, allowing a plurality of groups to also be classified according to the level of dust pollution, as another example.

Furthermore, if an area of carpet located separately from another area of carpet in a predetermined area of a living room as shown in FIG. 6B, the carpet group 600 may be classified into small groups 600a and 600b, using the position information of the carpet and the information on the floor material. For example, the carpet group 600 may be classified into small groups 600a and 600b using position information of areas 612 and 614 and the information on the floor material, wherein the area 612 is of carpet and has coordinate values of (x5, y5) to (x10, y10), and the area 614 is of carpet and has coordinate values of (x20, y5) to (x25, y10). Group information 610 that includes feature information 610a of an area may be included in the classified group, and also identification information (i.e., G1 and G2) 604 according to each group may be given to the classified group. The feature information 610a of the area may include the floor material of the area where the robot 200 is located, the distance between the robot 200 and an obstacle located above the robot 200, the information on the dust pollution level of the area where the robot 200 is located, the position information of the area where the robot 200 is located, and the information on the obstacle located on the moving path of the robot 200 in the predetermined area. In addition, it is apparent that the feature information 610a may include various kinds of information such as the cleaning frequency and identification information for each group, as may be determined by one skilled in the art.

Accordingly, if the user selects carpet (area) through the button or the selection screen (e.g., touch screen and LCD screen) attached to the robot 200, the search module 250 may search the information corresponding to the floor material (e.g., carpet) from the group information, and may design the moving path of the robot 200 using the searched group information. In an embodiment, the search module 250 may design the moving path of the robot 200 to first move the robot to an area 616 nearest to the area where the robot 200 is located.

Furthermore, if the user transmits a control command toward a predetermined carpet area through the remote controller, the search module 250 may read the control command, search information corresponding to the control command from the group information, and extract the searched information. Thus, the search module 250 may design the moving path of the robot 200 using the extracted group information, for example. Here, as a result of the search, if the information corresponding to the control command does not exist, the control module 270 may move the robot 200 to an area to which the control command is transmitted, and collect the feature information of the area. The dirt remover 290 may be attached to the cleaning robot 200 so as to remove the dirt on the moving path of the robot 200 while the robot 200 is moving along the moving path.

As described above, the moving path of the robot 200 may be designed in such a manner that the group is classified according to the floor material and the stored group information is searched. However, the group may be classified according to various predetermined reference ranges as shown in FIGS. 7A-7D, for example, and the moving path of the robot 200 may be designed and controlled using the principle of FIGS. 6A-6D, as another example.

FIGS. 7A-7D illustrates another example of group information classified according to a predetermined reference range.

Figure 7A:
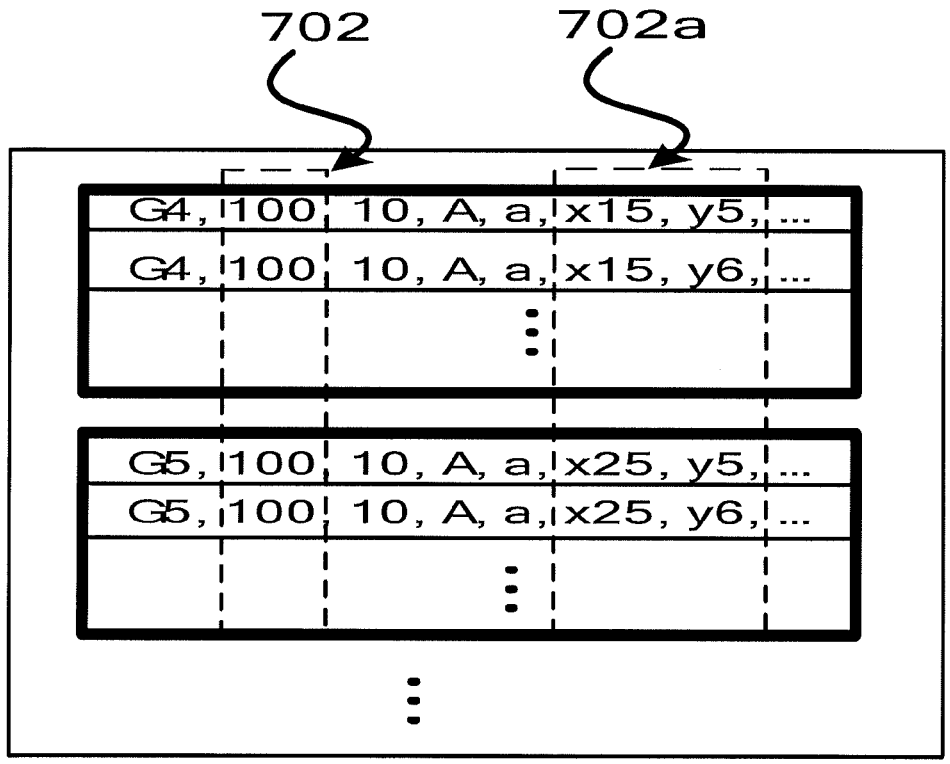
FIG. 7A-7D illustrate another example of group information classified according to a predetermined reference range, according to an embodiment of the present invention.

As shown in FIG. 7A, the analyzer 230 may classify the group using the distance information between the robot 200 and the obstacle located above the robot 200. For example, the analyzer 230 may classify each area into groups for each type of furniture, such as a bed, a table and a sofa, using the distance information between the robot 200 and the furniture located above the robot 200, or may classify the distance between the robot 200 and the furniture located above the robot 200 into predetermined reference ranges of, for example, 0 cm~30 cm, 30 cm~50 cm, 50 cm~90 cm, and 91 cm and greater. For example, an identification value of 100 may be given to the range of 0 cm~3 cm, an identification value of 110 may be given to the range of 30 cm~50 cm, and an identification value of 120 may be given to the range of 50 cm~90 cm. FIG. 7A illustrates a group of areas 702 to which an identification value of 100 is given in the range of 0 cm~3 cm, for the distance between the robot 200 and the furniture located above the robot 200. Here, the analyzer 230 may classify each group into small groups G4 and G5 using position information 702a of the furniture and the distance information 702 between the robot 200 and the furniture located above the robot 200.

Figure 7B:
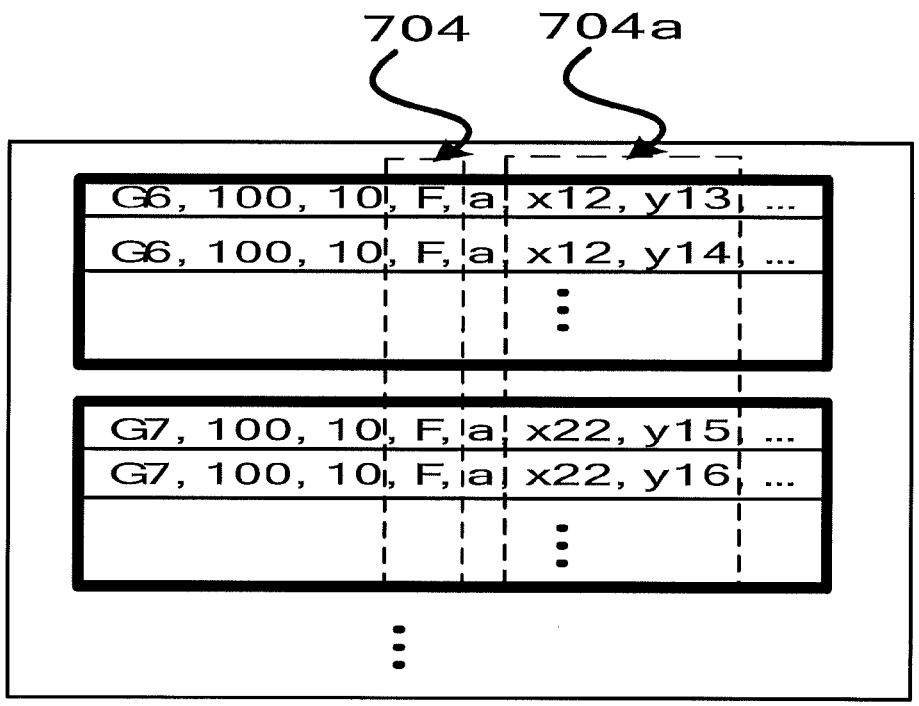

As shown in FIG. 7B, the analyzer 230 may determine predetermined reference ranges according to a predetermined dust pollution level using the dust pollution level information for the area where the robot 200 is located, and may classify the group according to each reference range. If an identification value of A is given to the area having a low dust pollution level, and an identification value of F is given to an area having a relatively high pollution level, the robot 200 may be controlled to focus on an area having the highest relative dust pollution level, for example. FIG. 7B illustrates a group of areas 704 to which the identification value of F is given using dust pollution level as the highest priority order, as an example. Here, the analyzer 230 may classify each group into small groups G6 and G7 using position information 704a for the area having the high dust pollution level, and the dust pollution level information 704.

Figure 7C:
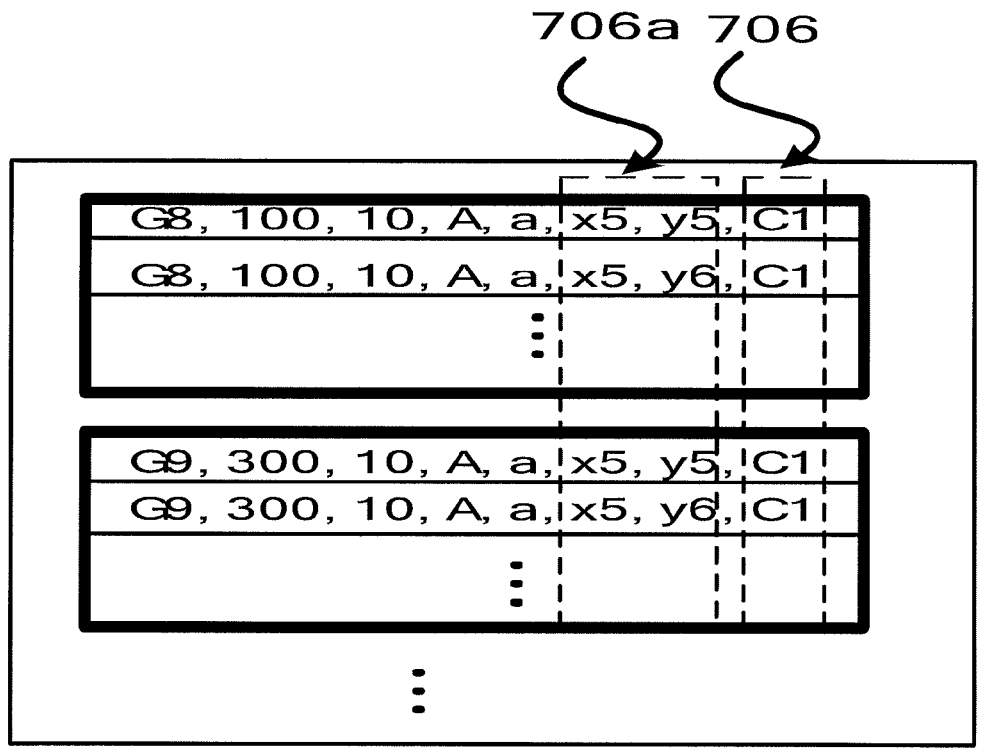

As shown in FIG. 7C, since the group having the high dust pollution level in FIG. 7B has a higher cleaning frequency than that of the other groups, the analyzer 230 may analyze the information on the cleaning frequency and classify the group according to the cleaning frequency. Here, the area having a high cleaning frequency may be controlled to have a lower cleaning strength than that of the area having a lower cleaning frequency, while the area having a low cleaning frequency may be controlled to have a higher cleaning strength than the area having the high cleaning frequency. For example, a value of C1 may be given to an area having a cleaning frequency of 10 times or greater for a week, a value of C2 may be given to an area having the cleaning frequency of 6 times to 9 times for a week, and a value of C3 may be given to an area having the cleaning frequency of 1 time to 6 times. FIG. 7C illustrates a group of areas 706 to which the identification value of C1 is given using the cleaning frequency as the highest priority order. Here, the analyzer 230 may classify each group into small groups G8 and G9 using position information 706a for the area having the high cleaning frequency and the cleaning frequency information 706.

Figure 7D:
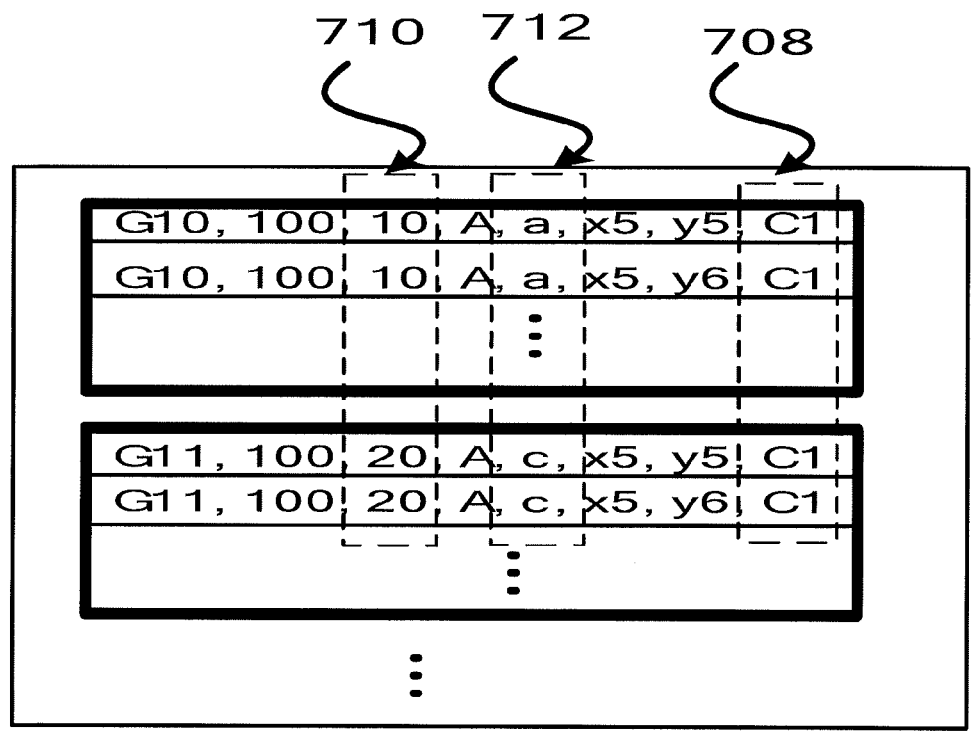

As shown in FIG. 7D, the analyzer 230 may collect a plurality of types of information to classify the information into the plurality of groups. The first priority order and the second priority order may be respectively given to the cleaning frequency and the floor material, and the feature information of the area stored in the first memory 222 may be aligned according to the priority order, classified into the plurality of groups according to a predetermined reference range, and stored in the second memory 224, for example. FIG. 7D illustrates groups G10 and G11 classified on the basis of the identification value 710 of the floor material corresponding to the second priority order, to which the identification value of C1 is given using the cleaning frequency as the first priority order, as an example.

The analyzer 230 may classify each group into small groups G10 and G11 using various kinds of information included in the group information, in addition to the aforementioned information. The moving path design module 260 may design the moving path of the robot 200 using the group information. In an embodiment, the moving path design module 260 may execute a design of the moving path by giving priority to an area closest to the area where the robot 200 is located. Here, the moving path design module 260 may execute the design of the moving path considering the information 712 of any obstacle on the moving path of the robot 200, in the predetermined area.

FIG. 8 illustrates a method of controlling the robot 200 if the control command is transmitted to the predetermined area, according to an embodiment of the present invention.

The repeated description described in FIG. 3A will be omitted, and the operations of controlling the robot using the group information of the classified groups will be described.

After the analyzer 230 analyzes and collects the information of the first memory 222 to store the group information, which is classified into the plurality of groups according to the predetermined reference range, in the second memory 224, the moving path of the robot 200 may be controlled according to the features of the area, using the group information. For example, the robot 200 (or remote controller) may be provided with a plurality of buttons corresponding to the various types of floor materials (e.g., a button to select carpet, linoleum, and wood). A plurality of buttons may also be provided according to the cleaning frequency. Here, if the user selects the group corresponding to a carpeted section, by clicking the first button, the search module 250 may search the group information corresponding to floor material of carpet to allow the moving path design module 260 to design the moving path of the robot 200 using the searched group information. In an embodiment, the moving path design module 260 may execute design of the moving path by giving the priority to the area closest to the area where the robot 200 is located, for example.

If the user transmits the control command toward a predetermined area using the remote controller, the search module 250 may read the control command and search the information corresponding to the control command from the group information, as in operations S801 and S811. Here, the search module 250 may search the group information using the position information, for the area to which the control command is transmitted, and the information on the floor material. As described above, if the search module 250 searches the information corresponding to the area, to which the control command is transmitted, from the group information, the moving path design module 260 may design the moving path of the robot 200 using the group information searched by the search module 250 and the control module 270 may move the robot 200 along the designed moving path.

If the search module 250 fails to search the information corresponding to the area to which the control command is transmitted, from the group information, the moving path design module 260 may execute design of the moving path to move the robot 200 from the current position to the area to which the control command is transmitted, whereby the robot 200 may be driven toward the area to which the control command is transmitted in operation S821.

Next, the control module 270 may collect the feature information of the area, to which the control command is transmitted, through the sensor module 210 by moving the robot 200 to the area in which the control command is transmitted, in operation S831.

Afterwards, the first memory 222 may store the collected information, and the analyzer 230 may analyze and collect the information of the first memory 222 and classifies the collected information into the plurality of groups according to the predetermined reference range, whereby the group information may be stored in the second memory 224, in operation S841.

The term "module", as used herein, may mean, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

In addition to this discussion, one or more embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to one or more embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, in the method, medium and apparatus classifying and collecting information on area features according to a robot's moving path, the robot controlled by the area features, and the method, medium and apparatus composing a user interface using the area features according to the present invention, the moving path of the robot may be controlled according to the feature information of the predetermined area.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for composing a user interface using area features, comprising:
   at least one processor to control a menu construction module to construct a plurality of menus using feature information of a predetermined area, the feature information being collected along a moving path of a robot; and
   a transmitter to transmit a control signal corresponding to the menus.

2. The apparatus of claim 1, further comprising an output module outputting the menus to a screen, wherein the menus comprise entries including at least one of a floor material of an area where the robot is located, a dust pollution level, a cleaning frequency, and information regarding an obstacle located above the robot.

3. A method of composing a user interface using area features, comprising:
   constructing a plurality of menus using feature information of a predetermined area, the feature information being collected along a moving path of a robot; and
   transmitting a control signal corresponding to the menus.

4. The method of claim 3, further comprising outputting the menus to a screen, wherein the menus comprise entries including least one of a floor material of an area where the robot is located, a dust pollution level, a cleaning frequency, and information regarding an obstacle located above the robot.

5. At least one non-transitory medium storing computer readable code to control at least one processing element to implement the method of claim 4.

* * * * *